L. M. LASLEY.
SOLDERING IRON.
APPLICATION FILED SEPT. 11, 1912.
1,088,286.
Patented Feb. 24, 1914.
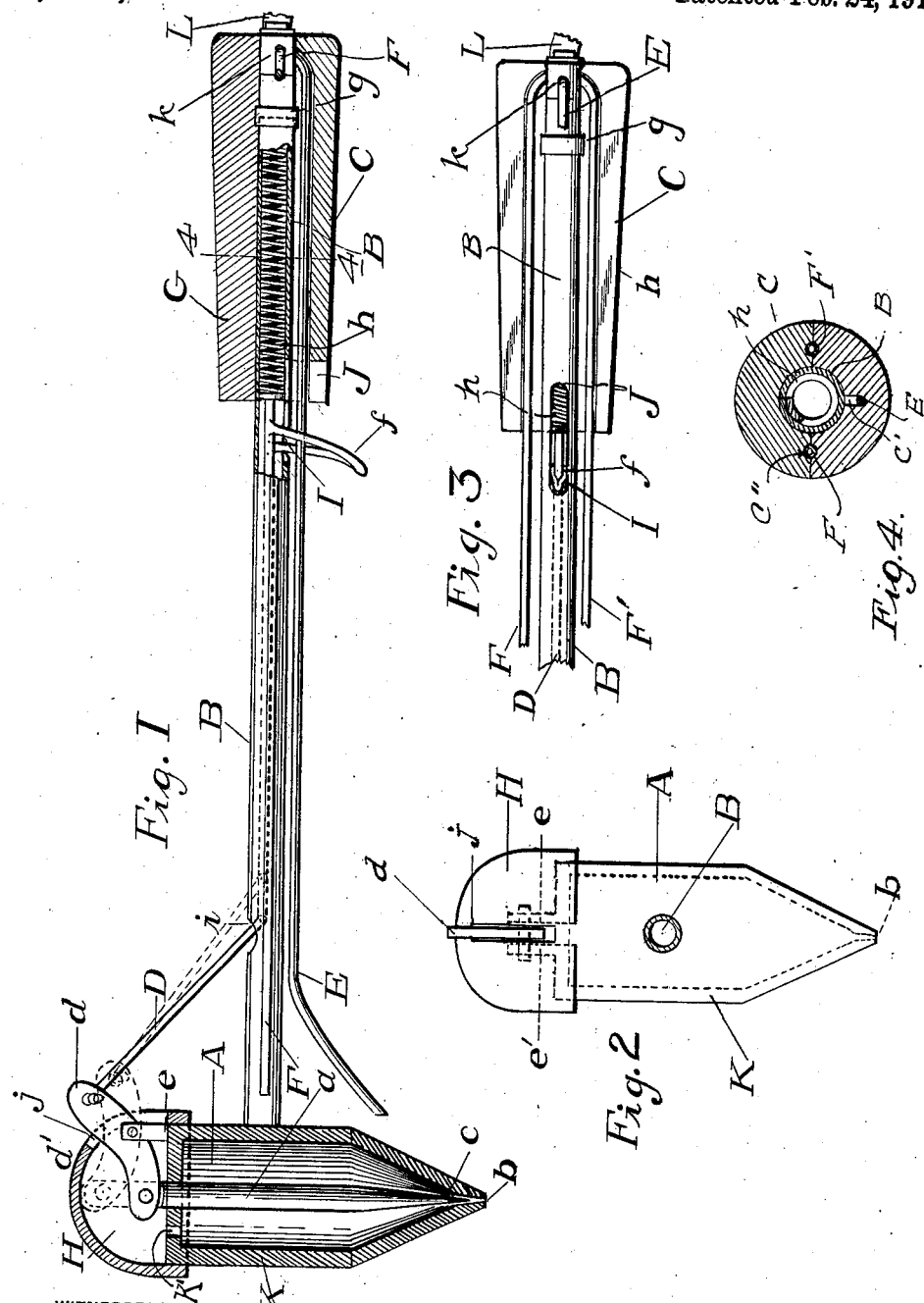
WITNESSES
Lillian Rosland
R. M. Saint
INVENTOR
Leonard M. Lasley
per
Claude E. Lieser
attorney in fact.

UNITED STATES PATENT OFFICE.

LEONARD M. LASLEY, OF PORTLAND, OREGON.

SOLDERING-IRON.

1,088,286. Specification of Letters Patent. Patented Feb. 24, 1914.

Application filed September 11, 1912. Serial No. 719,717.

*To all whom it may concern:*

Be it known that I, LEONARD M. LASLEY, a citizen of the United States, residing at Portland, in the county of Multnomah and State of Oregon, have invented a new and useful Soldering-Iron, of which the following is a specification.

My invention relates to improvements in soldering irons, and the object of my improvements are, first, to provide means by which melted solder can be automatically applied to the object being soldered direct from the iron itself; and second, to provide a means by which the soldering material can be automatically melted while the iron is in use and kept continuously melted. I attain these objects by the mechanism illustrated in the accompanying drawings, in which—

Figure 1 is a vertical section of the iron, parts of the same being shown in elevation; Fig. 2 is a back view of the body of the iron; and Fig. 3 is a bottom view of the handle of the iron after removing a portion of the wood surrounding the same, also showing a portion of the rod connecting the handle and body of the iron. Fig. 4 is a transverse section taken through the handle.

Similar letters refer to similar parts throughout the several views.

The small tank or receptacle in which the soldering material is placed is denoted by A which consists of the copper, brass or iron casing K shaped as shown in Figs. 1 and 2, forming thereby the circular cavity A, wherein the soldering material is deposited through the opening K' in the upper portion of the said body K. The metal cap H, which fits tightly over the body K and which can be removed at will, forms a covering to the opening of the cavity A in the body K. This cap is slit at the point "$j$" in the manner shown in Figs. 1 and 2, to enable the lever "$d$" to move up and down in the manner hereinafter described. The pointed pin "$a$" stands in the center of the circular cavity A with its point "$c$" resting in the small opening in the body K denoted by "$b$", forming thereby a stopper for the said mouth "$b$". An upward movement of the pin "$a$", by means hereinafter described, opens the mouth "$b$" allowing the melted solder (melted in manner hereinafter detailed) to flow from the cavity A in such amounts as desired by the operator according to the distance raised. The pin "$a$" is vertically adjusted by means of the trigger "$f$", connected to and operating the said pin in manner as follows: The circular, hollow, metal rod B forms a casing for the small wire D which enters the said rod B at the point "$i$" and extends back until it comes in contact with the spring "$h$" also contained in the rod B, and held in place at the end of the said rod B, denoted by "$g$". The wire D is hinged to the lever "$d$", which lever is hinged to the pin "$a$" and rests upon the fulcrums "$e$" and "$e'$". The trigger "$f$" protrudes from the wire D through the opening in the circular casing B at the point I, and any pressure brought to bear upon the said trigger "$f$" draws back the wire D, thereby contracting the spring "$h$"; brings the lever "$d$" into the position as shown by the dotted lines "$d'$", thereby raising the pin "$a$" allowing thereby an opening at the mouth "$b$" as large or as small as the operator may desire, according to the amount of pressure upon the said trigger "$f$", and thereby admitting of the flowing of as much melted solder as desired. Immediately upon release of the pressure upon the trigger "$f$" the spring "$h$", relaxing, pushes the rod D forward, which rod in turn, drops or lowers the pin "$a$", through the lever "$d$", into place, and closes the opening "$b$".

The handle C consists of a circular wooden casing formed in two sections and provided with a groove C' and channels C'', fitted tightly upon the end of the rod B as shown and niched in such manner that the tubes E, F, F' and $k$ may be fitted therein, the tubes E, F and F' being disposed in a semicircle at 90° apart.

The hollow, metal tube "$k$" protrudes from the wooden handle in such a manner that a small rubber hose L may be attached thereto for the purpose of admitting gas to the tube "$k$" and the tubes connected thereto as hereinafter described. From the tube "$k$" run three hollow, metal tubes. The tubes F and F' extend forward, one on each side of the rod B, as shown in Fig. 3, to within about one-quarter of an inch of the body of iron. The tube E extends forward, on the lower side of the rod B as shown in Fig. 1. This tube is bent downward, as shown in Fig. 1, thereby drawing the mouth of the same toward the lower portion of the body of the iron. Now, by admitting gas into the tube "$k$" by means of the hose L connected thereto, which in turn distributes the gas to the tubes E, F, and F', as hereinabove described, and lighting the same at the mouths of the said tubes E, F, and F', an even heat will be thrown upon all portions of the body K, thereby melting the soldering material therein contained, and, upon manipulation of the trigger "f" in the manner hereinbefore detailed, the melted solder will be allowed to flow freely upon the object being soldered and in such amounts as desired by the operator.

I claim:

In a soldering iron, a hollow body having an opening at its lower end, a fulcrum block carried by the upper side of said body, a lever pivotally secured intermediate its ends to said block, a pin pivotally secured to one end of said lever, said pin adapted to close the opening in the lower end of said body, a hollow rod having a handle connected to said body and extending at right angles thereto, a gas tube carried by said handle and extending under said rod to a point adjacent said body for directing a flame upon said body, an angularly bent wire connected to said lever and extending back through said rod, a spring bearing upon said wire for holding said pin in said opening of said body, a trigger comprising a wire loop connected to said wire for moving said wire in one direction, said gas tube passing through said trigger whereby said tube will be held in a central position under said rod.

LEONARD M. LASLEY.

Witnesses:
LILLIAN ROSLAND,
R. M. SAINT.